United States Patent
Obrist et al.

(10) Patent No.: US 6,213,733 B1
(45) Date of Patent: Apr. 10, 2001

(54) COMPRESSOR FOR THE AIR-CONDITIONING SYSTEM OF A MOTOR VEHICLE

(75) Inventors: Frank Obrist, Dornbirn (AT); Jan Hinrichs, Friedrichsdorf (DE); Peter Kuhn, Weinheim (DE); Hans-Jürgen Lauth, Neu Anspach (DE)

(73) Assignee: LuK Fahrzeug-Hydraulik GmbH & Co., KG (DE)

( * ) Notice: Subject to any disclaimer, the term of this patent is extended or adjusted under 35 U.S.C. 154(b) by 0 days.

(21) Appl. No.: 09/435,173

(22) Filed: Nov. 5, 1999

Related U.S. Application Data

(62) Division of application No. 09/033,839, filed on Mar. 3, 1998.

(30) Foreign Application Priority Data

| Mar. 3, 1997 | (DE) | 197 08 503 |
| Mar. 3, 1997 | (DE) | 197 08 517 |
| Mar. 3, 1997 | (DE) | 197 08 598 |
| Feb. 25, 1998 | (DE) | 198 07 923 |

(51) Int. Cl.$^7$ .............................. F04B 9/00; F04B 35/00
(52) U.S. Cl. .......................................... 417/319; 417/269
(58) Field of Search ........................ 417/63, 319, 269, 417/223; 123/56.3; 464/30; 474/17

(56) References Cited

U.S. PATENT DOCUMENTS

| 4,175,915 | 11/1979 | Black et al. |
| 4,178,136 | 12/1979 | Reid et al. |
| 4,801,248 | 1/1989 | Tojo et al. |
| 5,391,058 | 2/1995 | Goto et al. |
| 5,528,976 | 6/1996 | Ikeda et al. |
| 5,749,710 | * 5/1998 | Kimura et al. ................ 417/63 |
| 5,782,219 | * 7/1998 | Frey et al. .................... 123/56.3 |
| 5,800,137 | * 9/1998 | Eital et al. ................... 417/319 |
| 5,899,811 | * 5/1999 | Kishibuchi et al. ........... 464/30 |
| 5,931,645 | * 8/1999 | Goto et al. ................... 417/269 |
| 5,975,860 | * 11/1999 | Obayashi et al. ............. 417/223 |
| 6,056,514 | * 5/2000 | Fukai .......................... 417/223 |
| 6,056,517 | * 5/2000 | Obrist et al. ................. 417/319 |
| 6,068,452 | * 5/2000 | Okada et al. ................. 417/223 |
| 6,092,997 | * 7/2000 | Kimura et al. ................ 417/269 |
| 6,110,061 | * 8/2000 | Kishibuchi et al. ........... 474/17 |

FOREIGN PATENT DOCUMENTS 0702167   3/1996   (EP).

* cited by examiner

*Primary Examiner*—Teresa Walberg
*Assistant Examiner*—Leonid Fastovsky
(74) *Attorney, Agent, or Firm*—Ostrolenk, Faber, Gerb & Soffen, LLP

(57) ABSTRACT

A compressor for an air-conditioning system of a motor vehicle is proposed, which has a controllable compression medium feed mechanism powered by a drive shaft and which, for example, is powered by the combustion engine of the motor vehicle by a belt driven by a drive shaft, where the belt is coupled with the drive shaft of the compressor. The compressor is characterized by the drive wheel (29) having a belt pulley body (31) engaged with the belt (33) and coupled via an elastic coupling element (35) with the drive shaft (7), and by the drive shaft (7) being equipped with a torque limiting mechanism (predetermined fracture point (65)). In the case of another version, it is envisaged that the support mechanism (127) contains a projection (137) protruding from the take-up plate (11) and preferentially forming a single piece with this, as well as a supporting element (139). Furthermore, it is envisaged that the supporting element (139) has a first sliding surface (143) which works in conjunction with a bearing surface (second bearing surface (145)) of the thrust bearing (129), and that the projection (137) and the supporting element (139) fit tightly together via a second sliding surface (147) and/or that the driver (81) and the drive shaft (7) are joined using different materials or are made from a single piece.

12 Claims, 6 Drawing Sheets

COMPRESSOR FOR THE AIR-CONDITIONING SYSTEM OF A MOTOR VEHICLE

This is a division of application Ser. No. 09/033,839, filed Mar. 3, 1998.

BACKGROUND OF THE INVENTION

The invention is concerned with a compressor for an air-conditioning system of a motor vehicle to the mechanism for driving the feed mechanism of the compressor, and to the connections within the drive system of the compressor.

Compressors of the type described here, which are also referred to as air-conditioning compressors, are familiar. They are powered by a belt in the compressor guided over a belt pulley, referred to in the following as a drive wheel. The belt in turn is powered by the crankshaft of the internal combustion engine. A relatively large electromagnetic clutch is integrated into the drive wheel of these compressors so that frequently the compressor cannot be built into small engine compartments. The clutch consists of a friction plate secured by a sprung component on the drive shaft of the compressor, such that in the event of the air-conditioning compressor jamming, the drive belt continues moving and the operation of components relevant to the safety of the motor vehicle that are also driven by this belt can be safeguarded.

Familiar air-conditioning compressors are designed as axial piston machines comprising at least one movable piston in a cylinder block. The piston conveys the medium to be compressed from an intake region into a compression region. The reciprocating action of the piston is effected by a swash plate rotating about an axis of rotation. This acts in conjunction with a take-up plate linked to at least one piston, the plate being positioned in the compressor housing such that it cannot rotate and is held by a support on a nonrotatable thrust bearing. The purpose of the thrust bearing is to take up the torque that is transmitted from the rotating swash plate to the take-up plate. It transpires that compressors of the traditional type are of complex construction in the region of the supporting member of the take-up plate, involving a large number of parts. Also the supporting member often gives rise to a weakening of the take-up plate. Furthermore, it is evident that traditional compressors require a relatively large space. This is brought about amongst other things by the fact that a driver—by means of which the swash plate is coupled to the drive shaft—grips the drive shaft or the torque is transmitted from the drive shaft to the swash plate by means of pins or by compression.

SUMMARY OF THE INVENTION

Accordingly it is the purpose of this invention to create a compressor that is of simple design, is small, and guarantees the safety of the overall functioning of the vehicle.

As a solution to this problem a compressor is proposed having a distinguishing feature of the that the drive wheel has a belt body, which acts in conjunction with the belt, and which is coupled to the drive shaft of the compressor by an elastic coupling element equipped with a torque limiting device. The drive wheel is of very small construction, as an electromagnetic clutch has been dispensed with. This means that the compressor is permanently linked to the drive and runs constantly. The varying requirement for refrigerant in the air-conditioning system is taken into account by the compression medium feed being regulatable, so that the compressor can be adjusted from a maximum to a minimum requirement of refrigerant. In order to safeguard the constant running of other belts attached to the drive of the compressor, a torque limiting device is envisaged, which uncouples the compressor if it jams.

The preferred compressor model is one which is distinguished by being equipped with a coupling plate which is attached to the drive shaft and which is joined to the belt body by means of the coupling element and has at least one bearing face that works in conjunction with the belt body. The bearing faces guarantee the support of the belt body both axially and radially and therefore precise positioning. In this way the wear on the drive belt and on the drive wheel is kept to a minimum.

Furthermore, the preferred compressor model is one which is distinguished by the drive wheel being supported against the compressor housing by a bearing in the form of a needle bearing. This enables a very compact construction for the drive wheel to be achieved.

In order to resolve the problem, a compressor is proposed in number of parts is reduced to a minimum by the fact that the take-up plate support contains a projection which protrudes from the take-up plate and forms a single part, and that this projection acts in conjunction with a single supporting member. The supporting member has a sliding surface which acts in conjunction with a face of the thrust bearing via which the take-up plate is supported, for example, against the compressor housing. The projection and supporting member fit against each other via a second sliding surface, so that on the one hand the supporting member is held securely to the projection making additional safety measures unnecessary, and on the other hand a certain amount of relative motion of the two parts on the sliding surface is possible, without incurring overloading. Alternatively, or in addition to the measures described above, in order to simplify the construction of the compressor, the driver, which connects the swash plate to the drive shaft, and the drive shaft are either joined to each other—preferably by welding, brazing and/or glueing—or are formed from a single piece of metal.

This version makes gripping of the drive shaft by the driver unnecessary, resulting in a smaller space requirement. As a result of this form of construction, one also finds that the swash plate can swivel further, allowing the compressor to be made shorter.

BRIEF DESCRIPTION OF THE DRAWINGS

The invention is explained in more detail with the aid of the following diagrams.

DESCRIPTION OF PREFERRED EMBODIMENTS

The basic design and functioning of a compressor constructed as an axial piston or reciprocating engine are well known, so that this will only be discussed briefly here.

Figure 1:
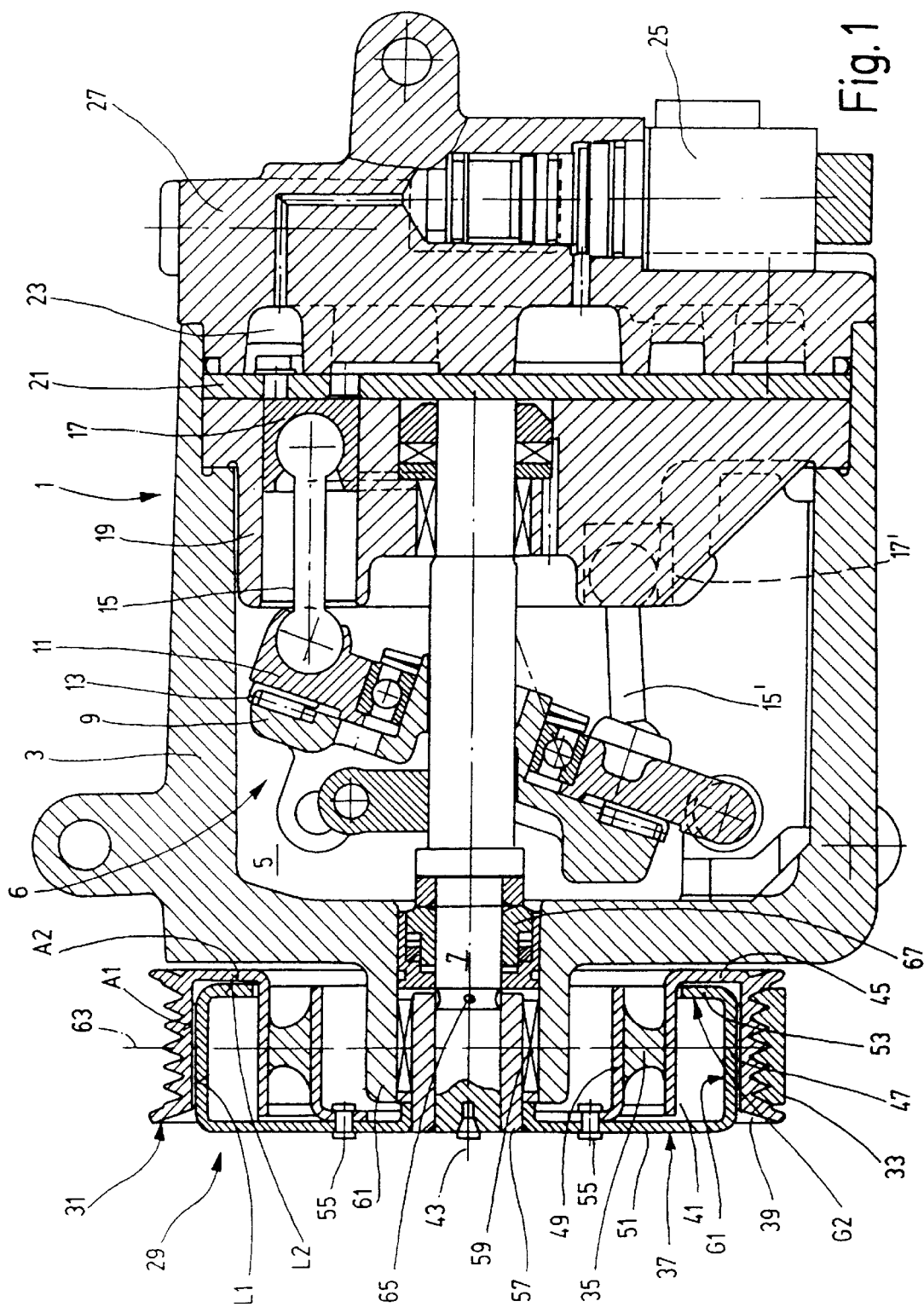
FIG. 1 is partial longitudinal section through a first version of a compressor.

The compressor 1 in FIG. 1, shown here as a longitudinal section, has a housing 3 which surrounds a cavity 5, which is also referred to as the drive compartment. A compression medium feed (or pump) mechanism 6 is built into this, which functions, for example, using the swash plate principle and is given a torque via a drive shaft 7. The functioning of the compression medium feed 6 is basically familiar, so that here only those parts are represented which can move back and forth on rotation of the drive shaft 7, the swash plate 9 in a cylinder block 19, i.e. a swash plate 9 set in rotation by the drive shaft 7, a nonrotatable take-up plate 11 supported in the housing, which acts in conjunction with the swash plate via a bearing mechanism 13, and pistons 17,17' coupled with the take-up plate 11 by means of connecting rods 15,15'. Due to the reciprocating motion of the pistons 17,17' the refrigerant is discharged via a valve plate 21 into a compression chamber 23 also referred to as a high compression chamber. The refrigerant is then fed via an appropriate connection to the air-conditioning unit of the vehicle. The housing 3 is closed off by means of a cover 27 which includes the compression chamber 23.

The compressor 1 is driven, for example, by the combustion engine of the vehicle. A driving torque is passed to the drive wheel 29 by a suitable belt pulley, which is coupled with the crankshaft of the combustion engine. This contains a belt pulley body 31, over which the belt 33 passes. The belt pulley body is set in rotation by the belt. The torque given to the belt pulley body is transferred to the drive shaft 7 via an elastic coupling element 35. The coupling element 35 here is not directly coupled with the drive shaft 7. Connected to the drive shaft is a coupling plate 37, to which the elastic coupling element is attached.

The belt pulley body 31 has here two separate concentric ring elements 39 and 41 running parallel to each other, whose center line coincides with the axis of rotation 43 of the drive shaft 7. They are connected to each other by an arm 45 running in a radial direction, i.e. perpendicular to the axis of rotation 43. The belt 33 fits closely onto the outer side of the outer or first ring element 39. On the inner side, i.e. the side of the inner or second ring element 41 facing the rotation axis 43, the elastic coupling element 35 is fitted such that it cannot rotate.

The coupling plate 37 also has two ring elements 47 and 49 that are concentric to each other and to the axis of rotation, and which are coupled to each other without being able to rotate via a plate 51 that is perpendicular to the axis of rotation. On the end of the outer, first ring element 47 that is facing away from plate 51 an attachment 53 is envisaged that is perpendicular to the axis of rotation 43, so that a U-shaped box section is formed from the plate 51, the first ring element 47 and the attachment 53 which, despite being of very light construction, is very stable. The coupling plate 37 is made, e.g., from sheet metal, the innermost second ring element 49 being attached to the plate 51, e.g. by bolts or rivets 55.

The inside diameter enclosed by the first ring element 39 is chosen to be somewhat larger than the outside diameter of the first ring element 47. Both ring elements are aligned parallel to each other and form a first bearing G1 functioning here as a sliding (or journal) bearing, where the outer surface of the first ring element 47 forms a bearing face L1 for the inner surface of the first ring element 39 serving as contact surface A1. The ring elements of the belt pulley body 31 and the coupling plate 37 fit into each other in such a way that the attachment 53, which runs parallel to the arm 45, can have a bearing surface L2, which acts together with a bearing surface A2 of the arm 45. Thus, we have here a second bearing G2 designed as a sliding bearing.

The contact surfaces between the belt pulley body 31 and coupling plate 37 are preferentially coated with a material suitable for a sliding bearing, so that support of the belt pulley body 31 on the coupling plate 37 is low in wear both axially (first sliding bearing G1) and radially (second sliding bearing G2).

The second ring element 49 of the coupling plate 37 is aligned coaxially with the second ring element 41 of the belt pulley body 31. They are separated such that the elastic coupling element 35 is between the second ring element 49 of the coupling plate lying nearer to the axis of rotation 43 and the second ring element 41 of the belt pulley body 31.

Thus the traction from the belt 33 can be transmitted to the drive shaft 7 via the belt pulley body 31, the coupling element 35 and the coupling plate 37. Fluctuations in torque and vibrations are damped by the elastic coupling element 35.

All in all one can see that the widths of the ring elements of the coupling plate 37 (measured in the direction of the rotation axis 43) and of the ring elements of the belt pulley body 31 are coordinated such that the belt pulley body 31 and the coupling plate 37 engage with each other to form the drive wheel 29, with the arm 45 of the belt pulley body 31 forming an inner face directed towards the compressor 1, and the plate 51 of the coupling plate 37 forming an outer face of the drive wheel 29. The drive wheel 29 is, therefore, very compact and of light construction. Both outer ring elements 39, 47 of the belt pulley body 31 and the coupling plate 37 form a simply constructed and precise bearing, which guarantees both axial and radial support of the belt pulley body, while the inner ring elements 41,49 of the belt pulley body and the coupling plate 31 are connected to each other by the elastic coupling element 35 in order to transmit the torque. The torque transferred from the belt 33 to the drive wheel 29 is transmitted from the coupling plate 37 to the drive shaft 7. For this purpose the coupling plate 37 is connected to the drive shaft 7 by means of a fixing collar 57, in such a way that they cannot rotate relative to each other. For its part the fixing collar 57 is supported by a bearing mechanism 59 on the housing 3 of the compressor 1, which contains a bearing attachment 61 running concentrically to the axis of rotation 53. As shown here, the bearing mechanism 59 can contain a needle bearing, which must be exactly in alignment with the central plane 63 of the drive wheel 29 and with the belt 33.

It is conceivable in principle to press the fixing sleeve 57 onto the drive shaft in such a way that the maximum transferable torque is limited. This means that on exceeding the maximum torque the fixing sleeve 57 can then rotate on the drive shaft. Thus, if the compression medium feed 6 of the compressor 1 becomes blocked, then the drive wheel 29 can continue to rotate, so that the belt 33 does not become jammed. In this way, other components driven by the belt 33, for example the servo-assisted steering of the vehicle, remain operable.

Preferably, however, a torque limiter should be provided, which has a predetermined fracture point on the shaft 7 in the drive shaft 29, and is between the position where the drive torque is fed to the drive shaft 7 by the drive wheel 29 and the compression medium feed device 6 situated inside the compartment. If this becomes jammed, the drive wheel 7 can break off in the region of the predetermined fracture point 65. For emergency operation the drive wheel 29 remains guided on the housing 3 of the compressor, so that the belt 33 can continue running and the functioning of the other components driven by the belt is safeguarded.

The drive shaft 7 has a guide sleeve 67 designed as a cylindrical guide element, which is positioned in the region of the opening for the drive shaft 7 through the wall of the housing, more precisely on the side facing away from the fracture point 65, i.e. between this point 65 and the pump unit 6. If the torque limiter 65 breaks in the event of the pump jamming, the guide sleeve 67 prevents any refrigerant leaking out of the compartment 5, while the drive shaft 7 remains supported inside the housing 3.

Figure 2:
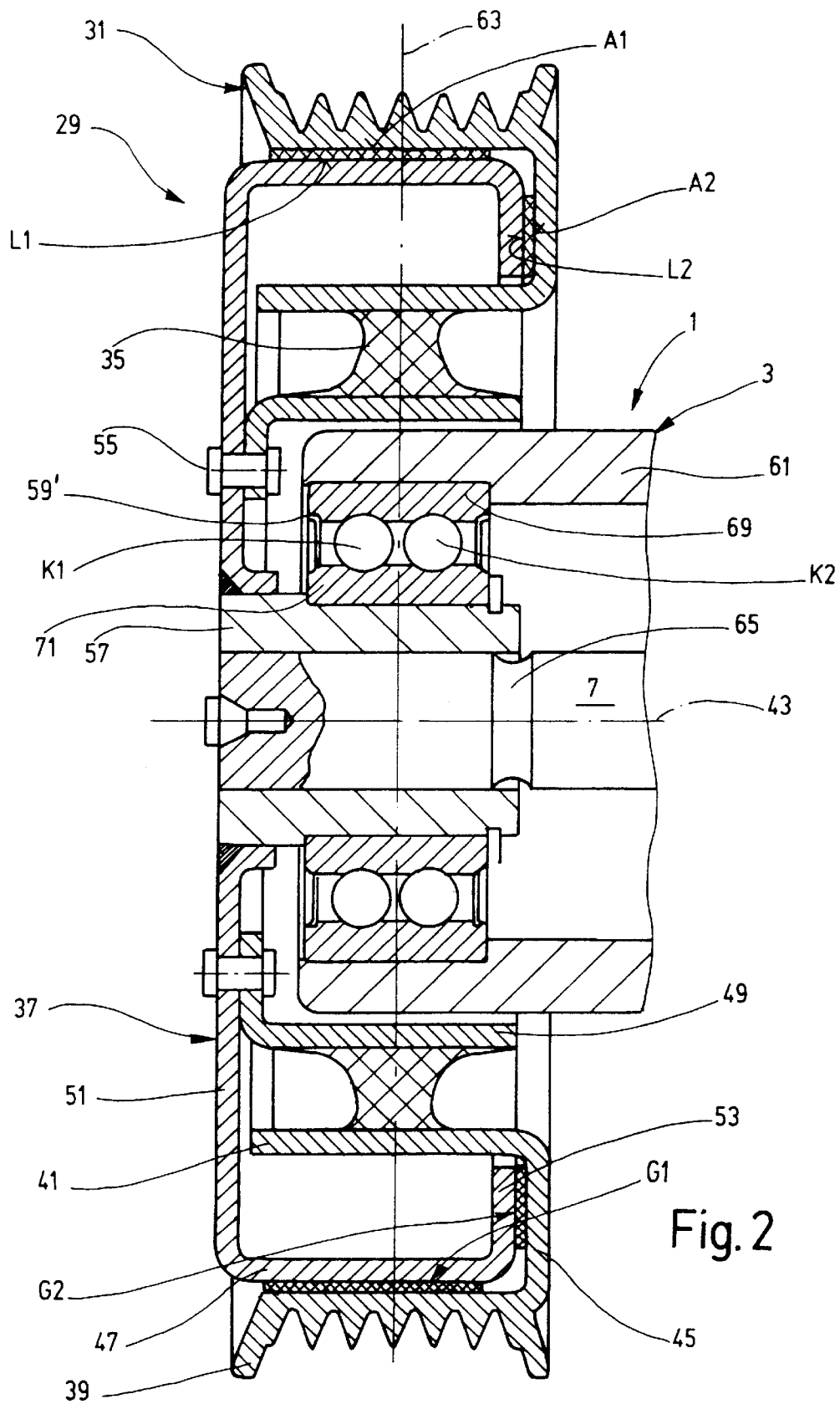
FIG. 2 is enlarged partial longitudinal section through a modified version of part of a compressor.

FIG. 2 shows a longitudinal section of part of a modified version of a compressor, indicating the bearing attachment 61 and the drive wheel 29. Similar parts have been designated with the same reference numbers, so that one may refer to the description of FIG. 1.

In the enlarged figure it is very clear once again how the belt pulley body 31 engages into the coupling plate 37 with both of its ring elements, which shows the ring elements 47 and 49. Both parts of the drive wheel 29 are practically interlocked, the outer concentric ring elements 39,47 functioning as support and bearing, and the two inner concentric ring elements 41,49 of the belt pulley body and coupling plate providing the traction.

The only difference with respect to FIG. 1 is that here a bearing mechanism 59 is proposed which is designed not as a needle bearing but as a double-rowed ball-bearing. The outer bearing ring 69 of the ball-bearing is fixed in the bearing attachment 61 and the inner bearing ring 71 is fixed to the fixing sleeve 57. Between the bearing rings there are two adjacent ball races K1 and K2 in the ball bearing arranged symmetrically to the center line 43 of the drive wheel 29, such that a very precise positioning of the drive wheel 29 on the drive shaft 7 is guaranteed. Further measures are not strictly necessary to guide the drive wheel accurately on the drive shaft 7.

If the bearing mechanism 59 is constructed as a needle bearing, as shown in FIG. 1, extreme care should be taken that the central plane 63 of the drive wheel 29 coincides with the central plane of the closed loop formed by the belt. In the case of a needle bearing it is therefore most advantageous to provide an additional guide mechanism to influence the path of the belt 33.

Figure 3:
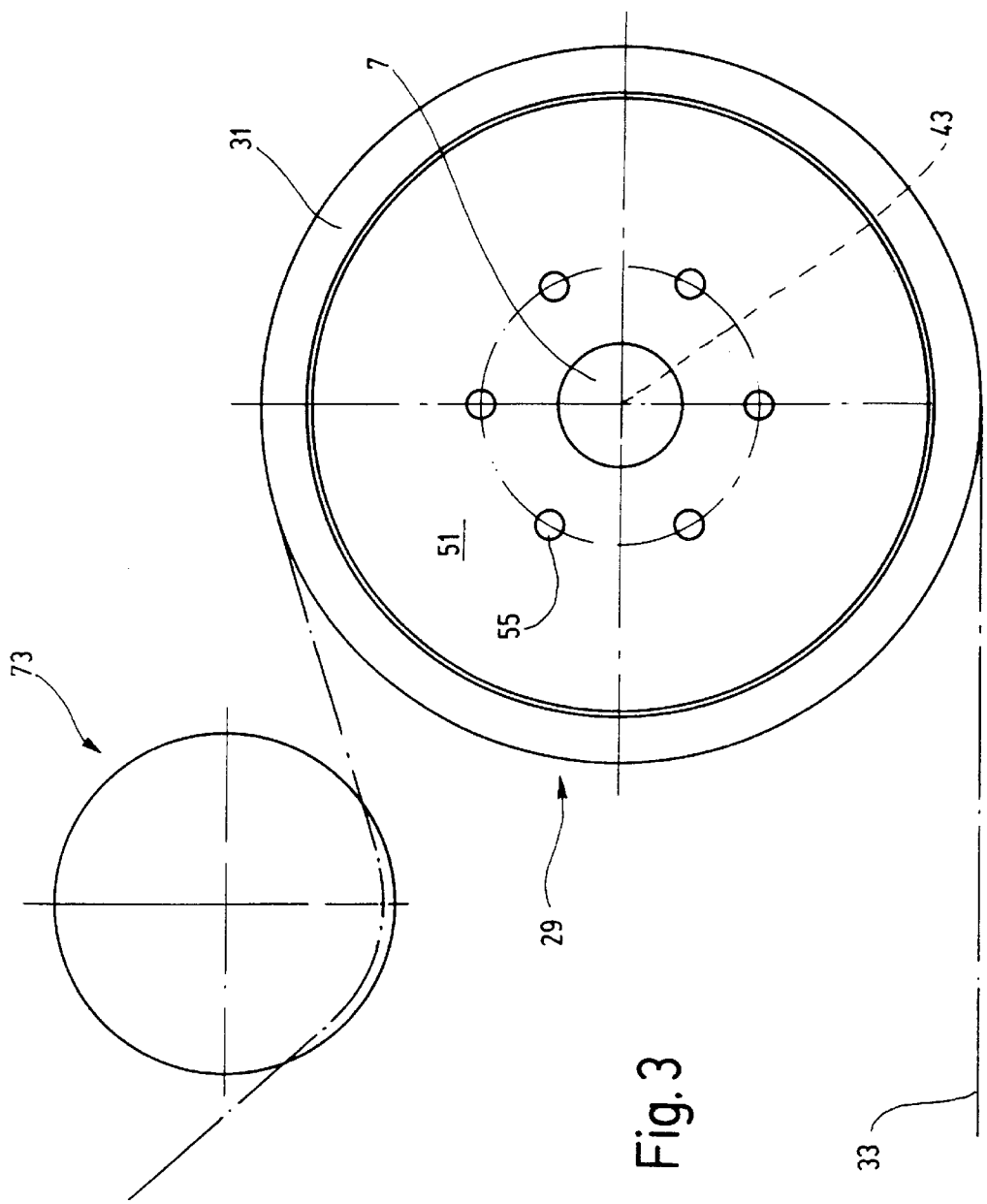
FIG. 3 is a plan view of the drive wheel of a compressor with a guide wheel.

FIG. 3 shows a plan view of the drive wheel 29 and the belt 33 running over it. An additional guide mechanism 73 is indicated here, which can be formed from a guide pulley or from the belt pulley of an additional aggregate in the internal combustion engine, for instance the power-steering pump. The guide mechanism 73 ensures that the central plane of the loop formed by the belt 33 coincides with that of the drive wheel 29, at least in the region of the drive wheel 29. A similar type of guide mechanism can of course also be incorporated in order to relieve the load on the ball bearing shown in FIG. 2.

Consequently it is clear that the power for the compressor 1 is obtained from a very simply constructed, compact drive wheel 29, made e.g. of sheet metal consisting of two interlocking components, the belt pulley body 31 and the coupling plate 37, both components having ring elements running concentrically to each other, that engage with each other in such a way that in the assembled condition of the drive wheel 29 all the ring elements of the belt pulley body and the coupling plate run concentrically to each other. The outer ring elements take on the functions of supporting and positioning, while the inner ring elements of the belt pulley body and the coupling plate transfer the torque. Since the inner ring elements are joined to each other by an elastic coupling element, which can be a rubber part or an exchangeable part, oscillations transmitted to the belt from the internal combustion engine can be damped. Secure protection for the belt is guaranteed by coupling the drive wheel 29 to the drive shaft 7, this being achieved by means of a torque limiter, i.e. the belt 33 is not stopped if the compressor jams, so that components that are crucial to the safety of the vehicle can continue to be driven by the belt.

Accordingly it is apparent that the compressor is permanently coupled to the belt 33. This is possible if the compression medium feed of the compressor is designed to be controllable, so that—as when the requirement for refrigerant is zero or very small—the load on the internal combustion engine is very small. In spite of the permanent coupling, there is no danger to the whole system, since it is possible to uncouple the compressor by means of the torque limiter.

Figure 4:
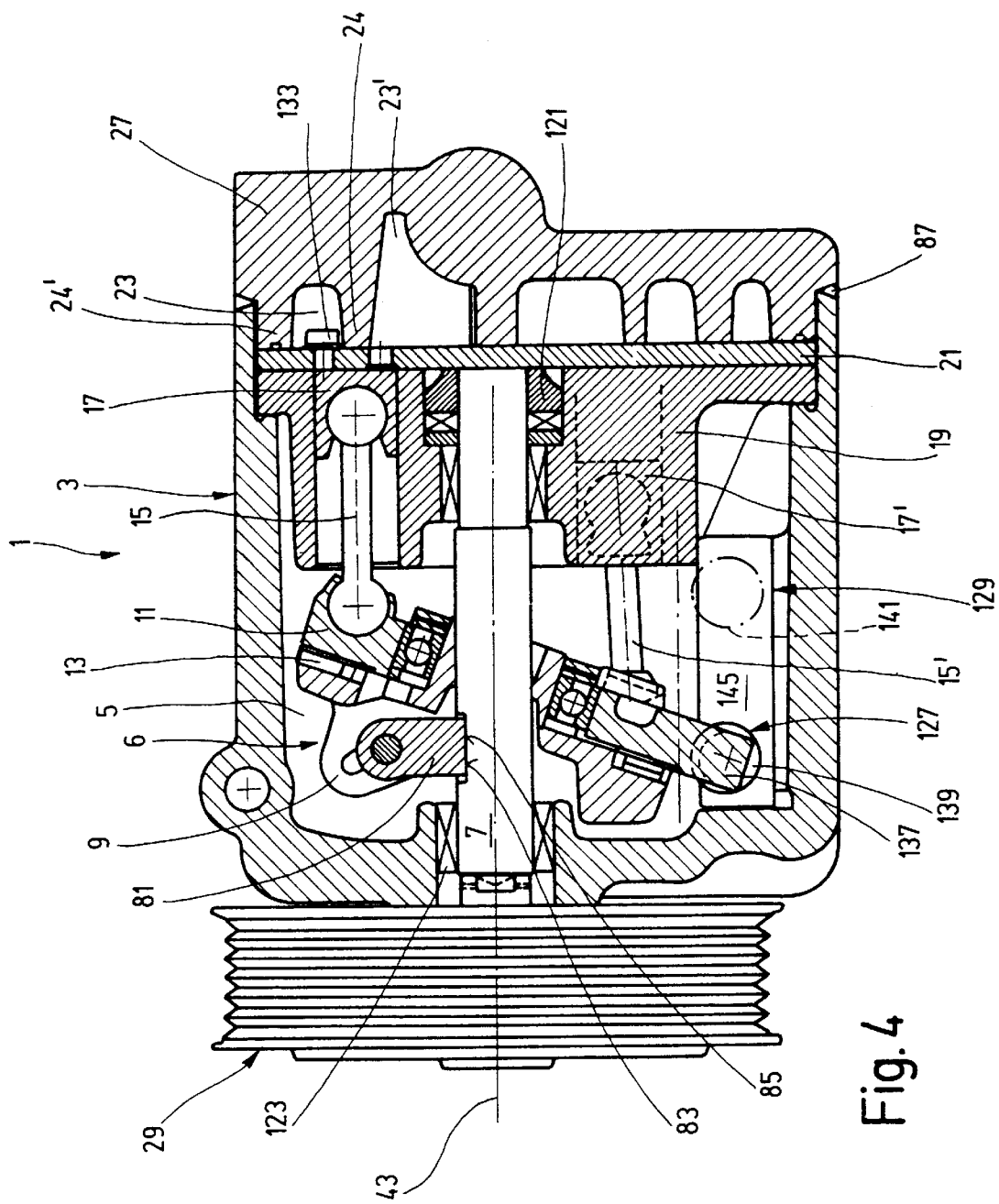
FIG. 4 is a longitudinal section through a second version of the compressor.

FIG. 4 shows a longitudinal section of a further version of the compressor 1. Identical parts are given the same reference number so that in this respect one can refer to the description in FIGS. 1 to 3. The versions depicted in FIGS. 1 and 4 are basically of a similar construction, the main difference being the design of the cover 27 and the connection of the drive shaft to the driver, by means of which the swash plate is coupled to the drive shaft.

The drive shaft 7 is supported at the end which is facing away from the drive wheel 29 in the cylinder block 19 by a fixed bearing 121 and in the region where it goes into the housing 3 by a loose bearing 123. The rotating swash plate 9 is coupled by a suitable bearing device 13 to the take-up plate 11 which is fixed in the housing so that it cannot rotate and which is supported by a support mechanism 127 on the thrust bearing 129, which is fixed in the housing 3 such that it cannot rotate. The thrust bearing 129 has two bearing surfaces, one of which 145 is shown here. The position of the drive shaft, the bearing mechanism 13 and the support mechanism supported by the thrust bearing correspond to the version of compressor depicted in Fig.1. They are described in more detail in FIG. 4 purely for reasons of clarity.

If the drive shaft 7 is set rotating by the drive wheel 29, the swash plate 9 rotates relative to the take-up plate 11, which is supported by the thrust bearing 129 and therefore does not turn with the rotation of the swash plate 9. The take-up plate 11 together with the swash plate 9 carry out a tumbling (wobbling) motion so that the pistons 17 and 17' move backwards and forwards along their longitudinal axis. This causes a medium to be discharged via a nonreturn valve mechanism 133 into the compression chamber 23 and from there on to its end use. The compressor 1, for instance, provides a compression medium for the air-conditioning system of a motor vehicle. The compression chamber 23 is situated inside the cover 27, which contains yet another compression chamber, the second compression chamber 23' representing the intake compression chamber. The compression chambers are separated from each other by a sealing cross-piece 24. A second seal 24' seals off the first compression chamber 23 from its surroundings. The seals can be chosen to have a suitable sealing mechanism and be mounted directly onto the cylinder block 19 or preferably—as in the version depicted in FIG. 4—onto the valve plate 21 which acts in conjunction with the cylinder block 19.

In the versions depicted in FIGS. 1 and 4 the longitudinal axes of the pistons 17, 17' are basically aligned parallel to the axis of rotation 43 of the drive shaft 7. However, it is also possible for the axes to be at an angle to each other. It is essential that the longitudinal axis of the pistons is not perpendicular to the axis of rotation of the drive shaft, so that a so-called axial piston machine is realised.

FIG. 4 shows that the take-up plate 11 is extended as a projection 137 which is part of the support mechanism 127 and acts in conjunction with a supporting element 139 which is also part of the support mechanism 127. The thickness of the projection 137 is the same as that of the take-up disc 11, resulting in particularly high strength. The supporting element 139 comprises a sliding face which slides along the bearing surface 145 of the thrust bearing 129. In the diagram (FIG. 4) the supporting element 139 is in its position of maximum swivel to the left. The position of maximum swivel to the right on the part of the supporting element is indicated by a dotted circle 141, thus simultaneously indicating the contrary swivel position of the swash plate 9. In the position depicted here the upper piston 17 is at the top of its cycle in the cylinder block 19, also described as top dead center, while the lower piston 17' is almost at its maximum inward position, also known as bottom dead center.

Figure 5:
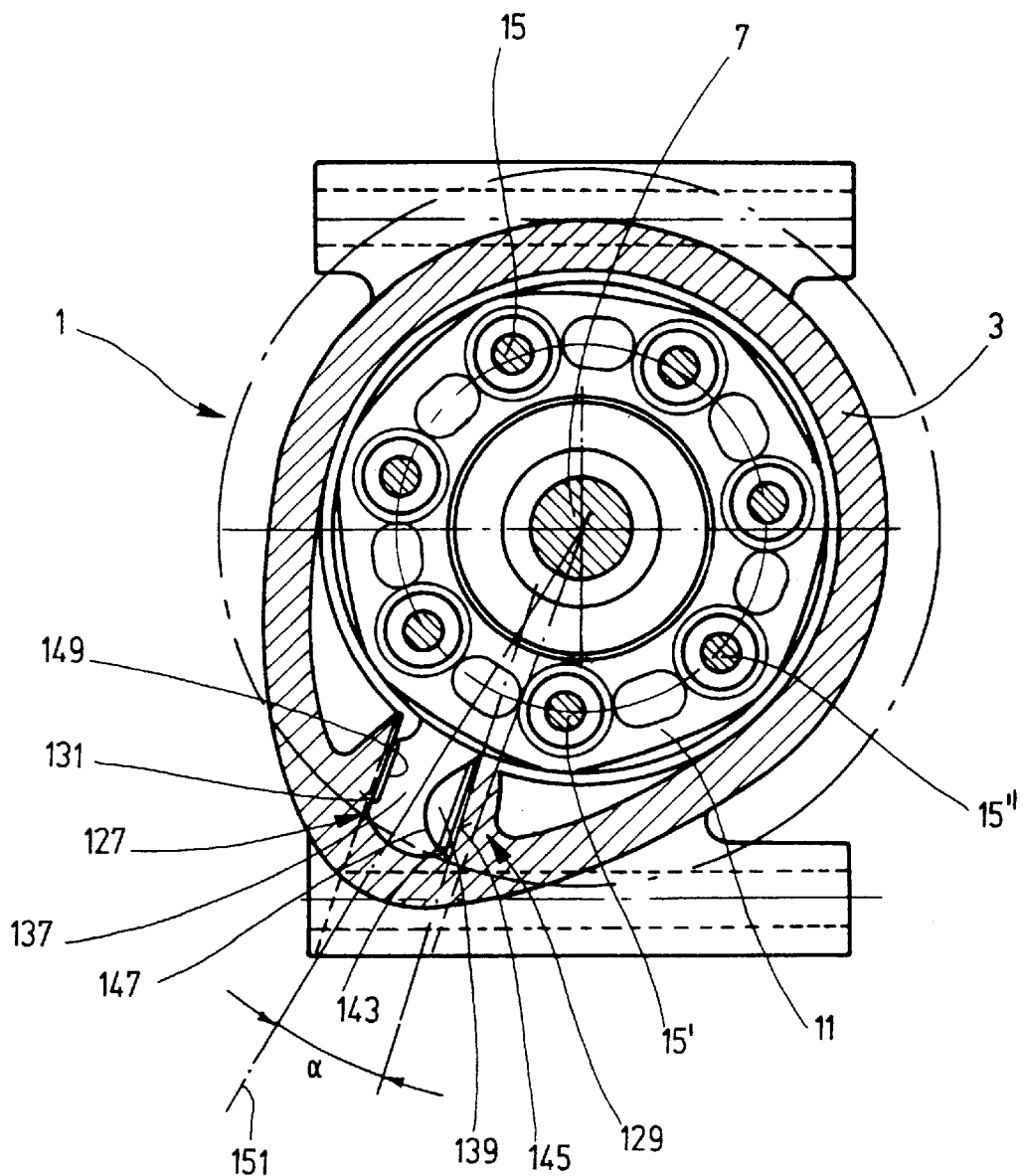
FIG. 5 is a cross-section of compressor shown in FIG. 4.

FIG. 5 shows a cross-section through the compressor 1. Identical parts are given the same reference numbers so that in this respect one can refer to the description in previous figures.

The cross-sectional diagram shows that the compressor 1 contains seven connecting rods, 15, 15', 15" etc, equidistant from one another in the circumferential direction. It is clear from the diagram that the take-up plate 11 continues as a projection 137, which is part of the support mechanism 127. The projection 137 is joined to the take-up plate 11 to form a single part. It works in conjunction with the supporting element 139, which slides along the bearing face 145 of the thrust bearing 129 with one of its sliding surfaces 143. The projection 137 and the supporting element 139 fit tightly together. In the region of contact there is a second sliding surface 147 which is preferentially spherical. The projection 137 has a—preferentially spherical—depression into which a protrusion of the—preferentially spherically sectioned—supporting element 139 fits. This ensures that the supporting element 139 moves with the tumbling motion of the projection 137. No further safety measures are required to couple together both parts of the support mechanism 127.

On the opposite side of the projection 137 from the supporting element 139 is a third sliding surface that works in conjunction with the bearing face 131 of the thrust bearing 129 depicted in FIG. 5.

It is clear from FIG. 5 that the first and second bearing surfaces 131,145 of the thrust bearing 129 run basically parallel to each other. It is also possible for them to be arranged at an acute angle opening in the direction of the take-up plate 11. The diagram also shows that the bearing surfaces and an imaginary line 151 bisecting the angle of rotation 43 subtend an acute angle of about 12°.

However, it is also possible to align the bearing surfaces parallel to the radial line 151. This version is not shown separately here.

Figure 6:
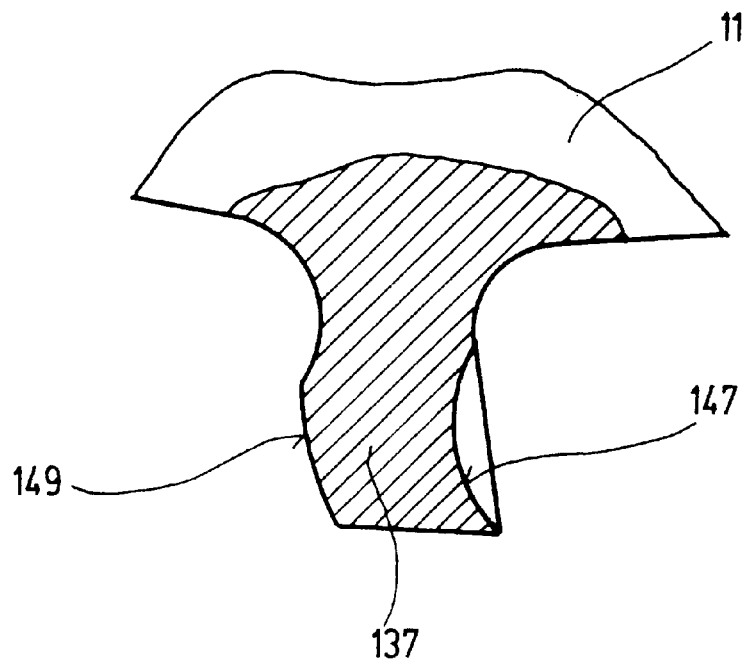
FIG. 6 is a longitudinal section of detailed enlargement of a modified version of the support.

FIG. 6 shows the projection 137 on the supporting mechanism 127 in a modified version. This is characterised by the fact that its third sliding surface 149 is not straight but curved. It is therefore possible to allow the projection 137 to tilt or swivel relative to the first bearing surface 131.

Figure 7:
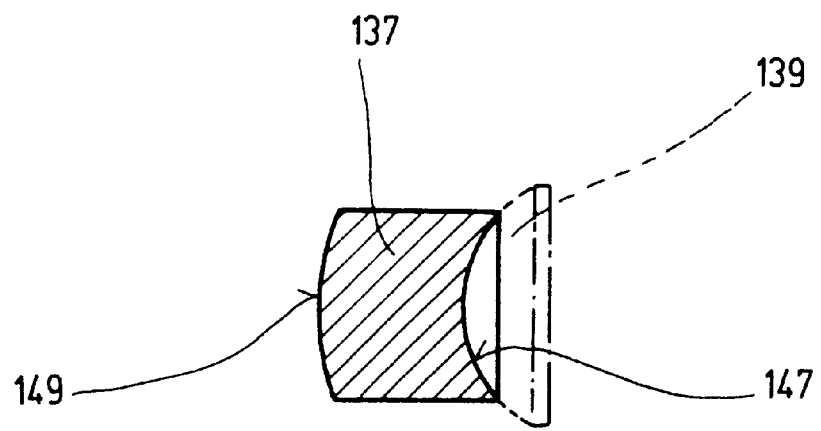
FIG. 7 is a cross-section of detailed enlargement of a modified version of the support.

A further version can be envisaged such that here too there is a depression in the third sliding surface 149 at right angles to the curvature shown in FIG. 7. It would also be feasible to design a version that only had one of the depressions depicted in FIGS. 6 and 7. This version is represented in FIG. 7 which shows a cross-section of the projection 137. In both cases the second sliding surface 147 can be discerned.

The supporting element 139 is not shown here, however. It is merely indicated in FIG. 7 by a dotted line.

Owing to the additional depression in the third sliding surface 149, depicted in FIG. 7., a swivelling motion relative to a straight line perpendicular to the plane of the diagram in FIG. 7 is possible.

All versions have in common that both bearing surfaces 131 and 145 and/or the sliding surfaces 143, 147 and 149 have a particularly resistant coating. It is also possible to coat the bearing surfaces 131 and 145 of the thrust bearing 129 with a resistant metallic strip. This is considered to be an economical design particularly if the housing 3 of the compressor 1 is constructed from a relatively soft material, such as aluminium for instance, where there is a danger of wear to the bearing surfaces of the thrust bearing 129. However, it is also feasible to use aluminium containing silicon for the manufacture of the housing, so that the bearing surfaces are intrinsically relatively resistant. In this case one can dispense with coating the bearing surfaces.

The sliding surfaces can also be treated with a resistant film, which can also be referred to as a wearing film. In particular it is appropriate to give the first sliding surface 143 of the supporting element 139 such a wearing film. It is, however, also possible to manufacture the supporting element 139 from a resistant material, such as steel, and thus to reduce the wear on interaction with the thrust bearing 129 to a minimum.

The particular version of the third sliding surface 149 shown in FIGS. 6 and 7 can not only be used in the case of the example explained in FIG. 5, where the bearing surfaces of the thrust bearing 129 subtend an angle α with an imaginary line 151. Rather, it is possible to allow for a curved sliding surface in the case of a projection which interacts with a thrust bearing whose bearing surfaces run parallel to the imaginary line 151.

According to this it is clear that optimal support of the take-up plate 11 on a thrust bearing 129 of the housing 3 is possible for the compressor construction given here. One sees from FIG. 5 that the thrust bearing 129 can be made as a single piece with the housing, i.e. it represents a part of the housing, so that in this respect a very simple and economical construction results.

From the sections shown in FIG. 6 and FIG. 4 it is clear that the projection 137 is formed as a single piece with the take-up plate 11, and that, therefore, there is no weakening of the take-up plate 11, i.e. of the projection, which is often the case for the present state of technology. It is also apparent that the support mechanism 127 is very simply constructed and only has one supporting element 139, which is positively held against the projection 137 by means of the second sliding surface 147. It is also conceivable that one could curve the sliding surface in the opposite sense and have a protrusion shaped as a spherical section on the projection, which engages into a supporting element that has an appropriate indentation. Here too, relative motion between projection and supporting element is possible, as is the case for the version described here. At the same time, it remains safe to say that the support mechanism is simply constructed and, thus, economical and functional to realise.

Due to the compact form of the support mechanism it is certain that the torque transmitted to the take-up plate 129 will be absorbed. This gives an optimal force transfer to the take-up plate.

In the version of the support mechanism 127 shown in the figures there is an unusual feature: the projection 137 is supported particularly well by the supporting element 139 on the relevant second bearing surface 145. Due to the rotation of the swash plate 9, e.g. in an anti-clockwise direction, a torque is transmitted to the take-up plate, such that the projection 137 is pressed against the second bearing surface 145. For the form chosen here, therefore, the preferred direction of rotation of the swash plate 9 has been determined. It runs according to FIG. 5 in an anti-clockwise sense. Therefore, if the compressor rotates in the opposite sense, the support mechanism 127 must be formed quasi as a mirror image, in order to guarantee optimal torque compensation. As a result of the interplay between the supporting element 139 and the thrust bearing 129, particularly small surface pressures are produced, which is the reason for the preferred direction of rotation of the compressor.

As seen from FIG. 4, the swash plate is coupled to the drive shaft 7 via a driver 81. The swash plate 9 is set in rotation by the driver 81, which engages here into an indentation 83 aligned perpendicular to the axis of rotation 43 of the drive shaft 7, and whose base is preferentially flat and e.g. is milled into the peripheral surface of the drive shaft 7. The driver 81 is joined to the drive shaft 7 by welding, friction welding, glueing, brazing, or a similar process. The version depicted in FIG. 4 shows the join of the driver 81 and the drive shaft 7. The contact surface 85 between the driver 81 and the drive shaft 7 can easily be shaped differently. For example, it is also possible to provide the driver or the drive shaft with a spherical surface and each counterpart with a corresponding indentation. The driver can also have a partially cylindrically shaped recess which is fitted onto the outer surface of the drive shaft 7 and joined to it.

However, it is also possible to make the drive shaft and the driver as a single part and to transmit the traction forces, that are fed via the drive wheel to the drive shaft, to the swash plate 9 in that way.

From the transverse section in FIG. 4 it is immediately clear that the driver 81 is coupled to the drive shaft 7 without any supplementary means (bolts or pins) in such a way that a torque can be transmitted from the drive wheel 29 to the swash plate 9. This is connected with the drive shaft 7 rigidly in the axial direction and without being able to rotate. A gripping of the drive shaft 7 by the driver 81 or the compaction of both components together is not necessary, so that a smaller requirement on space occurs than is the case for conventional compressors. The fact that the driver itself is very small means that the swash plate can swing out further, so that the compressor itself is also smaller than conventional compressors.

The driver and the drive shaft of the version of compressor shown in FIG. 1 can of course also be constructed from materials bonded together.

The housing 3 and cover 27 are joined to each other in an appropriate way. Purely as an example here, a V shaped groove 87 is indicated, which is intended to run along the line joining the housing 3 with the cover 27 and which allows the parts to be welded together. One can dispense with the groove 87, if one uses a laser welding method. Basically, however, any method of joining the housing 3 with the cover 27 is possible which will close off the housing in a pressure-tight way. The construction of the housing is not significant for the coupling between drive shaft 7 and driver 81 discussed here.

To summarise, it must be stressed that a small compressor of simple, and consequently economical construction can be realised using one or more of the constructional measures described in FIGS. 1 to 7. Especially advantageous is the combination of the support mechanism, including a projection extending from the take-up plate, and a supporting element, in which the supporting element has a sliding surface which acts in conjunction with a bearing surface of the thrust bearing and in which the projection and the supporting element fit tightly together by means of a second sliding surface, the driver and the drive shaft being either joined from two compatible materials or formed as a single piece. A further version that is particularly advantageous is one where the support mechanism is in accordance with the invention and the drive wheel has a belt pulley body which is coupled with the drive shaft by means of an elastic coupling element, and the drive shaft is equipped with a torque limiting device, e.g. a predetermined fracture point. Construction of the drive wheel in accordance with the invention is sufficient on its own to solve this problem. What brings the most advantage, however, is the compressor with the above features. The subject of the invention is however not limited to this. The design of the support mechanism according to the invention or joining the driver to the drive shaft—either as a single piece or from separate materials—also solve(s) the problem.

All these versions of compressor have one thing in common, which is that the construction of the compressor has been simplified compared to existing compressors, and a preferentially short and compact construction has been realised. Over and above this, the compressor shows a high functional safety, where the safety for the whole functioning of the vehicle can also be safeguarded if faults occur. This is firstly realised by means of a drive shaft with torque limiter, as well as, for example, by joining the driver to the drive shaft. This connection can, for example, be matched to the torque transmitted in such a way that if the compression medium feed is blocked, the connection is severed. The drive wheel can then rotate freely, so that in the interests of safety the operation of vehicle components which are also operated by the drive wheel belt can be safeguarded.

What is claimed is:

1. A compressor for an air conditioning system for a motor vehicle or the like, the compressor comprising;

a compression medium feed mechanism which is adjustable to vary the compression of a medium, a drive shaft which is connected to the feed mechanism and is rotated to operate the compression medium feed mechanism; a drive wheel on and coupled with the drive shaft;

a belt drive to the drive wheel including a drive belt for rotating the drive wheel, the drive wheel having a belt pulley that engages the belt; an elastic coupling element between the drive shaft and the belt pulley on the drive shaft; and a torque limiter along the drive shaft.

2. The compressor of claim 1, wherein the torque limiter device comprises a fracture point on the drive shaft between a drive to the shaft and the belt pulley body.

3. The compressor of claim 1, further comprising a coupling plate coupled to the drive shaft to rotate together and the coupling plate being connected to the belt pulley via the elastic coupling element which is adapted to absorb torque.

4. The compressor of claim 3, further comprising at least one bearing between the coupling plate and the belt pulley so that the belt pulley is slidable with respect to the coupling plate.

5. The compressor of claim 3, wherein the coupling plate has first and second bearing surfaces extending in respective first and second different directions and the belt pulley having third and fourth bearing surfaces extending in the first and second directions, respectively with the first and third bearing surfaces being oriented and cooperating for providing axial support of the belt pulley on the coupling plate and the second and fourth bearing surfaces cooperating for providing radial support between the belt pulley and the coupling plate.

6. The compressor of claim 1, wherein the compressor includes a housing through which the shaft extends, the belt pulley being outside the housing and the feed mechanism being inside the housing; a bearing mechanism for supporting the drive wheel on the compressor housing.

7. The compressor of claim 6, wherein the bearing mechanism comprises a needle bearing.

8. The compressor of claim 6, wherein the bearing mechanism comprises a double row ball bearing.

9. The compressor of claim 1, further comprising a guide mechanism spaced from the compressor for guiding the belt toward the belt pulley body.

10. The compressor of claim 9, wherein the guide mechanism comprises a pulley spaced from the belt pulley.

11. The compressor of claim 1, wherein the torque limiter comprises a predetermined fracture point along the shaft.

12. The compressor of claim 6, further comprising a guide sleeve supported in the housing positioned between the compression medium feed of the compressor and the torque limiter.

* * * * *